US010710886B2

(12) United States Patent
Xu et al.

(10) Patent No.: US 10,710,886 B2
(45) Date of Patent: Jul. 14, 2020

(54) METHODS FOR SYNTHESIZING MESOPOROUS ZEOLITE ETS-10 CONTAINING METAL WITHOUT A TEMPLATING AGENT

(71) Applicant: PetroChina Company Limited, Beijing (CN)

(72) Inventors: Tiegang Xu, Beijing (CN); Tiandi Tang, Beijing (CN); Wenqian Fu, Beijing (CN); Lei Zhang, Beijing (CN); Runsheng Shen, Beijing (CN); Guoren Cai, Beijing (CN); Baoli Ma, Beijing (CN); Weichi Xu, Beijing (CN); Guangming Wen, Beijing (CN); Jinhe Song, Beijing (CN); Dan Wang, Beijing (CN); Mingwei Tan, Beijing (CN); Wencheng Zhang, Beijing (CN); Jintao Guo, Beijing (CN); Gang Wang, Beijing (CN); Quanguo Zhang, Beijing (CN); Xianjun Wu, Beijing (CN); Liyan Guo, Beijing (CN); Lei Fang, Beijing (CN); Liru Cong, Beijing (CN); Guojia Zhang, Beijing (CN); Chunming Dong, Beijing (CN); Yu Liang, Beijing (CN)

(73) Assignee: PetroChina Company Limited, Beijing (CN)

( * ) Notice: Subject to any disclaimer, the term of this patent is extended or adjusted under 35 U.S.C. 154(b) by 0 days.

(21) Appl. No.: 16/410,219

(22) Filed: May 13, 2019

(65) Prior Publication Data
US 2020/0071174 A1 Mar. 5, 2020

(30) Foreign Application Priority Data
Aug. 28, 2018 (CN) .......................... 2018 1 0986390

(51) Int. Cl.
*C01B 39/08* (2006.01)
*B01J 29/89* (2006.01)
(Continued)

(52) U.S. Cl.
CPC ............... *C01B 39/00* (2013.01); *B01J 29/89* (2013.01); *B01J 35/1019* (2013.01);
(Continued)

(58) Field of Classification Search
CPC ..... C01B 39/085; B01J 29/89; B01J 35/1019; B01J 35/1038; C01P 2006/12; C01P 2006/14
See application file for complete search history.

(56) References Cited

U.S. PATENT DOCUMENTS

2009/0187053 A1 7/2009 Kuznicki et al.

FOREIGN PATENT DOCUMENTS

| CN | 102923729 A | 2/2013 |
| CN | 104229819 A | 12/2014 |
| CN | 107601520 A | 1/2018 |

OTHER PUBLICATIONS

Prasnath et al.,"Hydrogen sorption in transition metal modified ETS-10", International Journal of Hydrogen Energy vol. 34, Issue 2, Jan. 2009, pp. 888-896 International Journal of Hydrogen Energy (Year: 2009).*

(Continued)

*Primary Examiner* — David M Brunsman
(74) *Attorney, Agent, or Firm* — Young Basile Hanlon & MacFarlane, P.C.

(57) ABSTRACT

The invention provides a method for synthesizing a mesoporous zeolite ETS-10 containing a metal without a templating agent. The method according to the invention comprises the steps of: mixing a silicon source with a NaOH solution to obtain a mixed solution so that the content of (Continued)

$Na_2O$ in the mixed solution is 10.0% to 20.0% by weight; adding a KOH or KF solution so that the content of $K_2O$ is 10.0% to 25.0% by weight and stirring it well; adding a titanium source solution and stirring it well; adding a precursor compound containing metal Ni and/or Co and stirring it well; and subjecting it to a crystallization reaction to obtain the mesoporous zeolite ETS-10. The mesoporous zeolite ETS-10 obtained by the invention has a specific surface area of 320 to 420 $m^2/g$, a mesoporous volume of 0.11 to 0.21 $cm^3/g$, and thus can be used as a catalyst and a support thereof in synthesis industry for macromolecular fine chemicals.

17 Claims, 2 Drawing Sheets

(51) Int. Cl.
    *C01B 39/00*      (2006.01)
    *B01J 35/10*      (2006.01)
    *B01J 37/04*      (2006.01)

(52) U.S. Cl.
    CPC .......... *B01J 35/1038* (2013.01); *B01J 37/04* (2013.01); *C01B 39/085* (2013.01); *B01J 2229/18* (2013.01); *C01P 2004/03* (2013.01); *C01P 2006/12* (2013.01); *C01P 2006/14* (2013.01)

(56) References Cited

OTHER PUBLICATIONS

Eldewik et al, "Cobalt substitution in ETS-10", Microporous and Mesoporous Materials vol. 48, Issues 1-3, Nov. 1, 2001, pp. 65-71 (Year: 2001).*
Direct synthesis of mesoporous zeolite ETS-10 and Ni-ETS-10 with good catalytic performance in the Knoevenagel reaction, J Porous Mater 2016, vol. 23, pp. 423-429.
Design and Synthesis of Bi-functional Catalyst Ni-ETS-10 With High Activity in the Oxidative Coupling of Alkenes With Aldehydes for Preparing α,β-Epoxy Ketones, Liaoning Chemical Industry, Feb. 2017, vol. 46, No. 2, pp. 112-114.
Co-ETS-10 and Co-AM-6 as active catalysts for the oxidation of styrene to styrene oxide and benzaldehyde using molecular oxygen, Chinese Journal of Catalysis, vol. 36, No. 6, 2015, pp. 897-905.
Generation of hierarchical pore systems in the titanosilicate ETS-10 by hydrogen peroxide treatment under microwave irradiation, Chemical Communications, 2006, 882-884.
The benefit of mesopores in ETS-10 on the vapor-phase Beckmann rearrangement of cyclohexanone oxime, Journal of Catalysis, 2008, 254, 84-90.
PreparationofMesoporousZeoliteETS10CatalystsforHighYieldSynthesisof946EpoxyKetones, ChemCatChem. 2015, 521-525.
Chinese Search Report dated Jul. 2, 2018 for CN Application No. 201810986390.2.
First Office Action and search report dated Mar. 16, 2020 for counterpart Chinese patent application No. 201810986390.2.

* cited by examiner

METHODS FOR SYNTHESIZING MESOPOROUS ZEOLITE ETS-10 CONTAINING METAL WITHOUT A TEMPLATING AGENT

CROSS-REFERENCE TO RELATED APPLICATION

This application claims priority to Chinese Patent Application No. 201810986390.2, filed on Aug. 28, 2018, which is hereby incorporated by reference in its entirety.

TECHNICAL FIELD

The invention relates to a method for synthesizing a mesoporous zeolite ETS-10 containing a metal without a templating agent, which method can synthesize zeolite ETS-10 that both contains a metal and has a mesoporous structure.

BACKGROUND

As a new type of Ti—Si zeolite molecular sieve, ETS-10 is a crystal with a three-dimensional porous structure having a 12-membered ring formed by $SiO_4$ tetrahedron connected with $TiO_6$ octahedron through oxygen bridges. It can be directly used for various catalytic reaction due to its unique skeleton structure and element composition. However, since a microporous ETS-10 has smaller pore size (0.74 nm), it may impede a reactant having larger molecules from entering the micropores when the molecular size of the reactant is larger than the pore size of the micropore, which is unfavorable for the catalytic transformation of the macromolecular reactants, thus limiting its production and application in industry. One way to solve this problem is to introduce mesopores into the grains of the microporous zeolite ETS-10.

Claudiu et al. (Chemical Communications, 2006, 882-884; Journal of Catalysis, 2008, 254, 84-90) proposed to treat microporous zeolite ETS-10 with microwave irradiation in an aqueous hydrogen peroxide solution to produce a mesoporous structure therein, which is, however, will destroy the skeleton structure of the microporous ETS-10 with a limited amount of mesopores as introduced.

Tang Tiandi et al. (ChemCatChem. 2015, 521-525, ZL 2014104060.X) reported that a mesoporous zeolite ETS-10 was successfully synthesized by using N,N-diethyl-N-octadecyl-N-(3-methoxysilylpropyl) ammonium bromide as a soft templating agent. Although this method has been greatly improved with regard to the post-treatment technology, it still needs a step of calcining at high temperature to remove the templating agent, which will cause environmental pollution; moreover, many templating agents are expensive, which is unfavorable for the extensive production and application.

Xiaojun Ni et al. (Direct synthesis of mesoporous zeolite ETS-10 and Ni-ETS-10 with good catalytic performance in the Knoevenagel reaction, J Porous Mater, 2016, No. 23, pp. 423-429) disclosed a method for synthesizing a mesoporous zeolite ETS-10 and zeolite Ni-ETS-10, wherein the mesoporous ETS-10 is synthesized by a Ti—Si gel having a molar composition of 4.4 $Na_2O$/1.9 $K_2O$/1.0 $TiO_2$/7.1 $SiO_2$/0.65 MRC/163.0 $H_2O$ through hydrothermal crystallization. In this method, the mesoporous zeolite ETS-10 containing a metal can only be synthezised under the interaction of a mesoporous templating agent MRC and a metal source.

It is found that there are no any existing techniques in which zeolite ETS-10 with high mesopore volume can be synthesized without a templating agent.

SUMMARY OF THE INVENTION

In view of above, an objective of the present invention is to provide a method for synthesizing a zeolite ETS-10 containing a metal and having high mesopore volume without a templating agent.

Another objective of the present invention is to provide a zeolite ETS-10 containing a metal and having high mesopore volume as synthesized.

Another objective of the present invention is to provide the uses of the zeolite ETS-10 containing a metal and having high mesopore volume as synthesized.

The present invention is mainly characterized in that a zeolite ETS-10 both containing a metal and having a mesoporous structure can be synthesized in the course of gel crystallization by directly introducing a metal and interacting the metal with titanium species and silicon species in the gel system, without using any organic templating agents during the synthesis of a mesoporous zeolite ETS-10.

In one aspect, the present invention provides a method for synthesizing a mesoporous zeolite ETS-10 containing a metal without a templating agent, which includes the steps of:

(1) mixing a silicon source with a NaOH solution to obtain a mixed solution so that the content of $Na_2O$ in the mixed solution is 10.0% to 20.0% by weight;

(2) adding a KOH or KF solution into the mixed solution of step (1) so that the content of $K_2O$ is 10.0% to 25.0% by weight and stirring it well;

(3) adding a titanium source solution into the mixed solution of step (2) and stirring it well;

(4) adding into the mixed solution of step (3) a precursor compound containing metal Ni and/or Co and stirring it well; and (5) subjecting the mixed solution of step (4) to a crystallization reaction to obtain the mesoporous zeolite ETS-10 (METS-10).

According to a specific embodiment of the present invention, in the synthetic method according to the present invention, said silicon source is a water glass with a composition of $SiO_2$ included in an amount of 5.2 to 6.0 mol/L, $Na_2O$ included in an amount of 1.3 to 2.0 mol/L, and $H_2O$ included in an amount of 45.0 to 50.0 mol/L.

According to a specific embodiment of the present invention, in the synthetic method according to the present invention, after step (1), the mixed solution of the silicon source and the NaOH solution may be cooled to room temperature.

According to a specific embodiment of the present invention, in the synthetic method according to the present invention, said titanium source is titanium trichloride.

According to a specific embodiment of the present invention, in the synthetic method according to the present invention, said precursor compound containing metal Ni is nickel nitrate hexahydrate, and said precursor compound containing metal Co is cobalt nitrate hexahydrate.

According to a specific embodiment of the present invention, in the synthetic method according to the present invention, the system for synthesis is controlled such that the total amount of metal Ni and Co comprises 1.5% to 3.0% by weight of the mass of zeolite, and the ratio of the atomic amount of metal Ni to Co is 0-1:1 or 1:1-0.

According to a specific embodiment of the present invention, in the synthetic method according to the present invention, said crystallization reaction is carried out under a condition in which the reaction temperature is 200° C. to 250° C. and the reaction time is 20 to 110 hours, preferably under an optimized condition in which the reaction temperature is 200° C. to 230° C. and the reaction time is 72 to 110 hours.

According to a specific embodiment of the present invention, in the synthetic method according to the present invention, each raw material in the system for synthesis is fed in a molar ratio, in terms of $SiO_2:TiO_2:Na_2O:K_2O:H_2O:NiO$, of (5~8):1:(3~7):(0.5~2):(100~220):(0.02~0.05), preferably in a molar ratio, in terms of $SiO_2:TiO_2:Na_2O:K_2O:H_2O:NiO$, of (6~7):1:(3~5):(1~1.7):(150~200):(0.03~0.04), wherein the molar number of sodium oxide is the sum total of sodium elements contained in the water glass as a silicon source and sodium hydroxide.

In the synthetic method according to the present invention, the zeolite ETS-10 containing a metal and having high mesopore volume can be synthesized by directly adding metal sources into the reaction system and adjusting the composition of the system without using a mesoporous templating agent. The zeolite is conventionally produced by a process having generally steps as follows: preparation of a gel system, loading into a reactor, crystallization, washing, drying and calcining, wherein the composition of the gel system has significant influence on properties, structure and morphology of the zeolite, while other steps are routine steps in the synthesis of the zeolite. In the present invention, it is possible to obtain a pure-phase mesoporous zeolite ETS-10 containing a metal without such a step as high-temperature calcination since the organic templating agent was not added in the inventive synthetic method.

In another aspect, the present invention also provides a mesoporous zeolite ETS-10 (METS-10) containing a metal, as synthesized without a templating agent, which is prepared by the method according to the present invention. The zeolite METS-10 prepared by the method according to the invention has a morphology that is different from the zeolite ETS-10 synthesized using a templating agent MRC by Xiaojun Ni et al.

The mesoporous zeolite ETS-10 containing a metal as synthesized without a templating agent according to the present invention has a specific surface area of 320 to 420 $m^2/g$, a mesopore volume of 0.11 to 0.21 $cm^3/g$. Further, it has a micropore volume of 0.10 to 0.13 $cm^3/g$. In the mesoporous zeolite ETS-10 containing a metal as synthesized without a templating agent according to the present invention, Ni and/or Co is included in an amount of 1.5% to 3.0% by weight based on mass of the zeolite.

In a further aspect, the present invention also provides the use of the mesoporous zeolite ETS-10 containing a metal as synthesized without a templating agent according to the present invention as a catalyst or a support thereof in the synthesis industry for macromolecular fine chemicals.

The raw materials used in the method according to the present invention include a silicon source (water glass), a titanium source (titanium trichloride), sodium hydroxide, potassium hydroxide, potassium fluoride, etc, all of which can be commercially available. The operating condition which is not specially described in the present invention is a normal temperature and normal pressure condition, or is carried out with reference to conventional operations in the field to which the invention belongs.

Compared with the prior art, the beneficial effects of the invention are as follows:

(a) The zeolite METS-10 containing a mesoporous structure and a metal site may be synthesized in the present invention by directly introducing a metal hetero-atom in the traditional hydrothermal synthesis method, without using a mesoporous templating agent. This product has a wide application prospect as a catalyst and a support thereof in synthesis industry for macromolecular fine chemicals.

(b) The product may be synthesized by a method which is simple, has no high requirement on the equipment, and has a relatively low price compared with the synthetic method using a templating agent, so that it may be put into production using the existing equipment by manufacturers producing molecular sieves.

DETAILED DESCRIPTION

Figure 1:
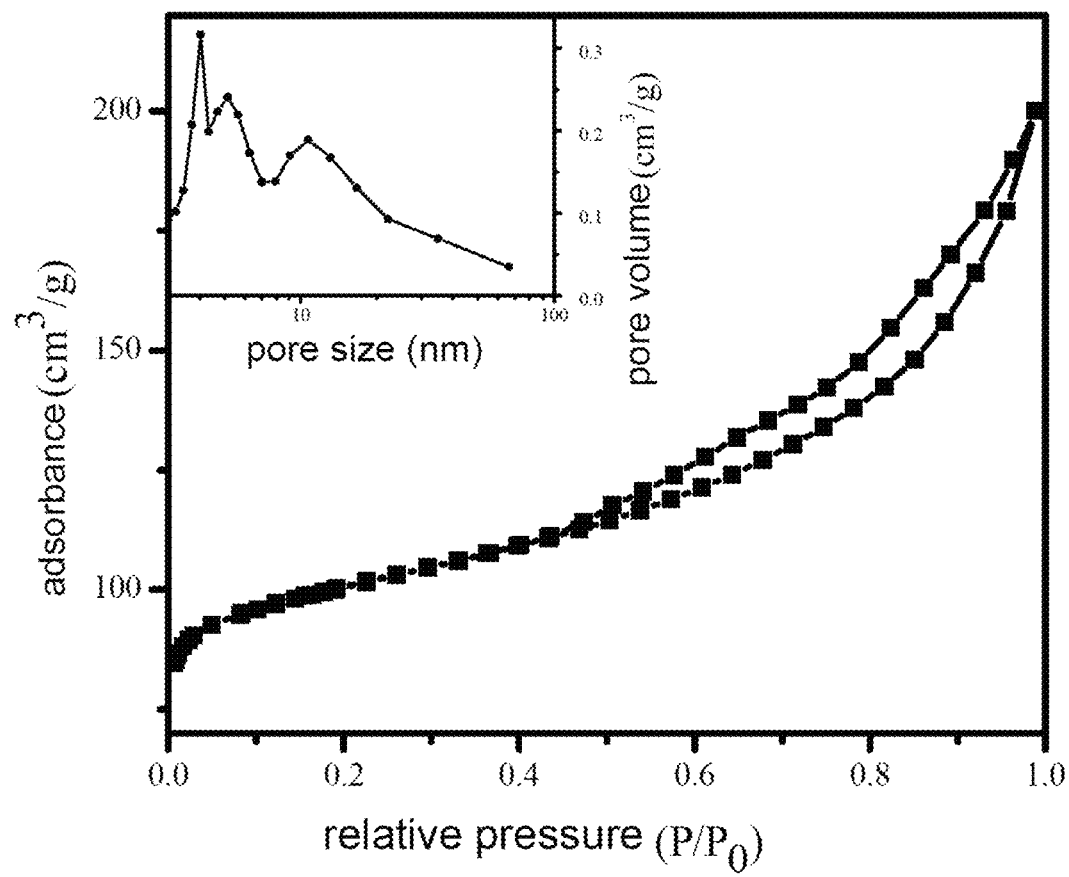
FIG. 1 is a graph showing the adsorption isotherm line and pore size distribution of the zeolite METS-10.

The technical solutions of the present invention is now described in detail as follows in order to have a better comprehension of the technical features, purposes and beneficial effects of the present invention, which, however, should not be understood as limiting the implementable range of the present invention.

The raw materials and solutions used in the examples are as follows (various heteroatoms exemplified as Ni, Co):

the components of water glass: $SiO_2$: 5.472 mol/L, $Na_2O$: 1.1706 mol/L, $H_2O$: 49.7493 mol/L;

solution (i): prepared by dissolving an amount of NaOH in 10 g $H_2O$, adding an amount of water glass and mixing it well;

solution (ii): prepared by dissolving an amount of KOH in 9.4 g $H_2O$ and mixing it well;

solution (iii): prepared by dissolving an amount of KF in 9.4 g $H_2O$ and mixing it well;

solution (iv): prepared by dissolving an amount of $Ni(NO_3)_2 \cdot 6H_2O$ in 3 g $H_2O$ and mixing it well;

solution (v): prepared by dissolving an amount of $Co(NO_3)_2 \cdot 9H_2O$ in 3 g $H_2O$ and mixing it well.

Example 1

The solution (i) was stirred for 30 minutes and added with solution (ii) and stirred for 1 hour, thereafter 13.1 g $TiCl_3$ solution was added thereto and stirred for 4 hours. The solution (iv) was added thereto and stirred for another 20 minutes, then the resulting mixture was transferred into a reactor and sealed, crystallized for 72 hours at 220° C. The molar ratio of each raw material in the system, in terms of $SiO_2:TiO_2:Na_2O:K_2O:H_2O:NiO$, is 7:1:5:1:200:0.04. The crystallized product was filtered, washed and dried to obtain the mesoporous zeolite ETS-10 containing a metal of this Example.

Example 2

The solution (i) was stirred for 30 minutes and added with solution (iii) and stirred for 1 hour, thereafter 13.1 g $TiCl_3$ solution was added thereto and stirred for 4 hours. The solution (iv) was added thereto and stirred for another 20 minutes, then the resulting mixture was transferred into a reactor and sealed, crystallized for 72 hours at 220° C. The molar ratio of each raw material in the system, in terms of $SiO_2:TiO_2:Na_2O:K_2O:H_2O:NiO$, is 6.8:1:4.7:1.3:163:0.04. The crystallized product was filtered, washed and dried to obtain the mesoporous zeolite ETS-10 containing a metal of this Example.

Example 3

The solution (i) was stirred for 30 minutes and added with solution (ii) and stirred for 1 hour, thereafter 13.1 g $TiCl_3$ solution was added thereto and stirred for 4 hours. The solution (iv) was added thereto and stirred for another 20 minutes, then the resulting mixture was transferred into a reactor and sealed, crystallized for 72 hours at 230° C. The molar ratio of each raw material in the system, in terms of $SiO_2:TiO_2:Na_2O:K_2O:H_2O:NiO$, is 6.8:1:3.7:1.3:163:0.04. The crystallized product was filtered, washed and dried to obtain the mesoporous zeolite ETS-10 containing a metal of this Example.

Example 4

The solution (i) was stirred for 30 minutes and added with solution (iii) and stirred for 1 hour, thereafter 13.1 g $TiCl_3$ solution was added thereto and stirred for 4 hours. The solution (iv) was added thereto and stirred for another 20 minutes, then the resulting mixture was transferred into a reactor and sealed, crystallized for 72 hours at 230° C. The molar ratio of each raw material in the system, in terms of $SiO_2:TiO_2:Na_2O:K_2O:H_2O:NiO$, is 6:1:3:1.7:150:0.03. The crystallized product was filtered, washed and dried to obtain the mesoporous zeolite ETS-10 containing a metal of this Example.

Example 5

The solution (i) was stirred for 30 minutes and added with solution (ii) and stirred for 1 hour, thereafter 13.1 g $TiCl_3$ solution was added thereto and stirred for 4 hours. The solution (iv) was added thereto and stirred for another 20 minutes, then the resulting mixture was transferred into a reactor and sealed, crystallized for 90 hours at 230° C. The molar ratio of each raw material in the system, in terms of $SiO_2:TiO_2:Na_2O:K_2O:H_2O:NiO$, is 6:1:3.7:1.3:163:0.04. The crystallized product was filtered, washed and dried to obtain the mesoporous zeolite ETS-10 containing a metal of this Example.

Example 6

The solution (i) was stirred for 30 minutes and added with solution (iii) and stirred for 1 hour, thereafter 13.1 g $TiCl_3$ solution was added thereto and stirred for 4 hours. The solution (iv) was added thereto and stirred for another 20 minutes, then the resulting mixture was transferred into a reactor and sealed, crystallized for 90 hours at 230° C. The molar ratio of each raw material in the system, in terms of $SiO_2:TiO_2:Na_2O:K_2O:H_2O:NiO$, is 6:1:3.7:1.3:163:0.04. The crystallized product was filtered, washed and dried to obtain the mesoporous zeolite ETS-10 containing a metal of this Example.

Example 7

The solution (i) was stirred for 30 minutes and added with solution (ii) and stirred for 1 hour, thereafter 13.1 g $TiCl_3$ solution was added thereto and stirred for 4 hours. The solution (iv) was added thereto and stirred for another 20 minutes, then the resulting mixture was transferred into a reactor and sealed, crystallized for 110 hours at 200° C. The molar ratio of each raw material in the system, in terms of $SiO_2:TiO_2:Na_2O:K_2O:H_2O:NiO$, is 5:1:3:2:100:0.02. The crystallized product was filtered, washed and dried to obtain the mesoporous zeolite ETS-10 containing a metal of this Example.

Example 8

The solution (i) was stirred for 30 minutes and added with solution (ii) and stirred for 1 hour, thereafter 13.1 g $TiCl_3$ solution was added thereto and stirred for 4 hours. The solution (iv) was added thereto and stirred for another 20 minutes, then the resulting mixture was transferred into a reactor and sealed, crystallized for 20 hours at 250° C. The molar ratio of each raw material in the system, in terms of $SiO_2:TiO_2:Na_2O:K_2O:H_2O:NiO$, is 8:1:7:0.5:220:0.05. The crystallized product was filtered, washed and dried to obtain the mesoporous zeolite ETS-10 containing a metal of this Example.

Example 9

The solution (i) was stirred for 30 minutes and added with solution (ii) and stirred for 1 hour, thereafter 13.1 g $TiCl_3$ solution was added thereto and stirred for 4 hours. The solution (v) was added thereto and stirred for another 20 minutes, then the resulting mixture was transferred into a reactor and sealed, crystallized for 72 hours at 220° C. The molar ratio of each raw material in the system, in terms of $SiO_2:TiO_2:Na_2O:K_2O:H_2O:CoO$, is 6.8:1:3.7:1.3:163:0.04. The crystallized product was filtered, washed and dried to obtain the mesoporous zeolite ETS-10 containing a metal of this Example.

Example 10

The solution (i) was stirred for 30 minutes and added with solution (iii) and stirred for 1 hour, thereafter 13.1 g $TiCl_3$ solution was added thereto and stirred for 4 hours. The solution (v) was added thereto and stirred for another 20 minutes, then the resulting mixture was transferred into a reactor and sealed, crystallized for 72 hours at 220° C. The molar ratio of each raw material in the system, in terms of $SiO_2:TiO_2:Na_2O:K_2O:H_2O:CoO$, is 5:1:3:2:100:0.02. The crystallized product was filtered, washed and dried to obtain the mesoporous zeolite ETS-10 containing a metal of this Example.

Example 11

The solution (i) was stirred for 30 minutes and added with solution (ii) and stirred for 1 hour, thereafter 13.1 g $TiCl_3$ solution was added thereto and stirred for 4 hours. The solution (v) was added thereto and stirred for another 20 minutes, then the resulting mixture was transferred into a reactor and sealed, crystallized for 72 hours at 230° C. The molar ratio of each raw material in the system, in terms of $SiO_2:TiO_2:Na_2O:K_2O:H_2O:CoO$, is 6:1:3:1.7:150:0.03. The crystallized product was filtered, washed and dried to obtain the mesoporous zeolite ETS-10 containing a metal of this Example.

Example 12

The solution (i) was stirred for 30 minutes and added with solution (iii) and stirred for 1 hour, thereafter 13.1 g $TiCl_3$ solution was added thereto and stirred for 4 hours. The solution (v) was added thereto and stirred for another 20 minutes, then the resulting mixture was transferred into a reactor and sealed, crystallized for 72 hours at 230° C. The molar ratio of each raw material in the system, in terms of $SiO_2:TiO_2:Na_2O:K_2O:H_2O:CoO$, is 8:1:7:0.5:220:0.05. The crystallized product was filtered, washed and dried to obtain the mesoporous zeolite ETS-10 containing a metal of this Example.

Example 13

The solution (i) was stirred for 30 minutes and added with solution (ii) and stirred for 1 hour, thereafter 13.1 g $TiCl_3$ solution was added thereto and stirred for 4 hours. The solution (v) was added thereto and stirred for another 20 minutes, then the resulting mixture was transferred into a reactor and sealed, crystallized for 90 hours at 230° C. The molar ratio of each raw material in the system, in terms of $SiO_2:TiO_2:Na_2O:K_2O:H_2O:CoO$, is 6.8:1:3.7:1.3:163:0.04. The crystallized product was filtered, washed and dried to obtain the mesoporous zeolite ETS-10 containing a metal of this Example.

Example 14

The solution (i) was stirred for 30 minutes and added with solution (iii) and stirred for 1 hour, thereafter 13.1 g $TiCl_3$ solution was added thereto and stirred for 4 hours. The solution (v) was added thereto and stirred for another 20 minutes, then the resulting mixture was transferred into a reactor and sealed, crystallized for 90 hours at 230° C. The molar ratio of each raw material in the system, in terms of $SiO_2:TiO_2:Na_2O:K_2O:H_2O:CoO$, is 7:1:5:1:200:0.04. The crystallized product was filtered, washed and dried to obtain the mesoporous zeolite ETS-10 containing a metal of this Example.

Example 15

The solution (i) was stirred for 30 minutes and added with solution (iii) and stirred for 1 hour, thereafter 13.1 g $TiCl_3$ solution was added thereto and stirred for 4 hours. The solution (v) was added thereto and stirred for another 20 minutes, then the resulting mixture was transferred into a reactor and sealed, crystallized for 110 hours at 230° C. The molar ratio of each raw material in the system, in terms of $SiO_2:TiO_2:Na_2O:K_2O:H_2O:CoO$, is 6.8:1:4.7:1.3:163:0.04. The crystallized product was filtered, washed and dried to obtain the mesoporous zeolite ETS-10 containing a metal of this Example.

Example 16

The solution (i) was stirred for 30 minutes and added with solution (iii) and stirred for 1 hour, thereafter 13.1 g $TiCl_3$ solution was added thereto and stirred for 4 hours. The solution (v) was added thereto and stirred for another 20 minutes, then the resulting mixture was transferred into a reactor and sealed, crystallized for 110 hours at 230° C. The molar ratio of each raw material in the system, in terms of $SiO_2:TiO_2:Na_2O:K_2O:H_2O:CoO$, is 6.8:1:3.7:1.3:163:0.04. The crystallized product was filtered, washed and dried to obtain the mesoporous zeolite ETS-10 containing a metal of this Example.

Table 1 records the mesoporous zeolite ETS-10 and the traditional zeolite ETS-10 with respect to a specific surface area, a mesopore volume, and a micropore volume. It can be seen that the mesoporous zeolite ETS-10 synthesized according to the method of the present invention has a mesopore volume of up to 0.21 $cm^3/g$, while the traditional zeolite ETS-10 only has a mesopore volume of 0.02 $cm^3/g$.

TABLE 1

Texture properties of the mesoporous zeolite ETS-10 and traditional zeolite ETS-10 synthesized under the same conditions

| Sample | BET specific surface area ($m^2/g$) | mesopore volume ($cm^3/g$) | micropore volume ($cm^3/g$) |
|---|---|---|---|
| mesoporous zeolite ETS-10 | 378 | 0.21 | 0.11 |
| microporous zeolite ETS-10 | 386 | 0.02 | 0.13 |

Table 2 records the texture properties of the mesoporous zeolite ETS-10 obtained in Examples 1 to 16.

TABLE 2

Texture properties of samples obtained in different Examples

| Example | BET specific surface area ($m^2/g$) | mesopore volume ($cm^3/g$) | micropore volume ($cm^3/g$) |
|---|---|---|---|
| Example 1 | 355 | 0.14 | 0.12 |
| Example 2 | 378 | 0.21 | 0.11 |
| Example 3 | 374 | 0.15 | 0.13 |
| Example 4 | 352 | 0.12 | 0.11 |
| Example 5 | 383 | 0.17 | 0.12 |
| Example 6 | 370 | 0.18 | 0.12 |
| Example 7 | 325 | 0.11 | 0.12 |
| Example 8 | 329 | 0.12 | 0.12 |
| Example 9 | 343 | 0.16 | 0.12 |
| Example 10 | 407 | 0.12 | 0.13 |
| Example 11 | 359 | 0.14 | 0.13 |
| Example 12 | 343 | 0.13 | 0.13 |
| Example 13 | 351 | 0.15 | 0.13 |
| Example 14 | 353 | 0.14 | 0.13 |
| Example 15 | 370 | 0.17 | 0.11 |
| Example 16 | 368 | 0.16 | 0.12 |

Figure 2:
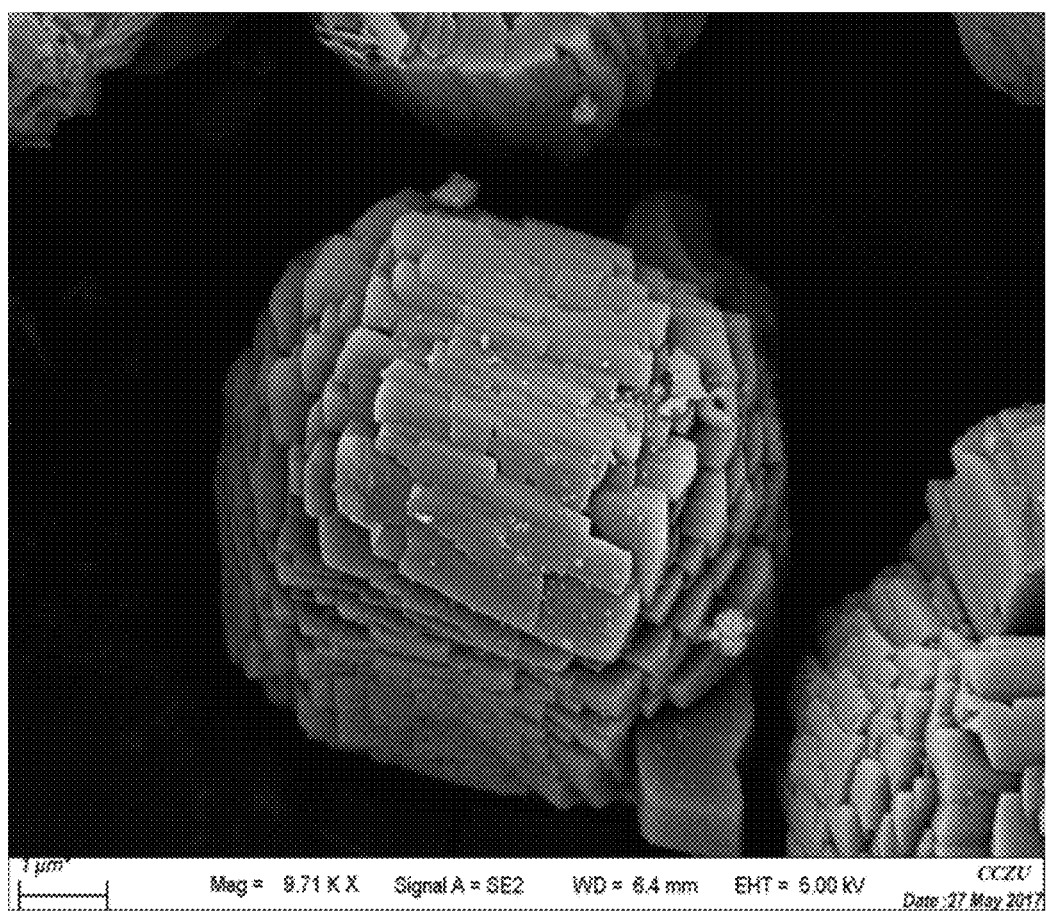
FIG. 2 is SEM micrograph of the zeolite METS-10.

FIG. 1 is a graph showing the adsorption isotherm line and pore size distribution of the zeolite METS-10 obtained in Example 2, which molecular seize has a significant mesoporous structure with a pore size centralized in 2 nm, 4.5 nm and 10.5 nm, which is beneficial to increase the reaction rate of a macromolecular sulfur-nitrogen heterocyclic compound. FIG. 2 is a SEM micrograph of the zeolite ETMS-10 obtained in Example 2, which shows that the molecular seize has a grain surface having many fractures, which forms natural side-corner sites possessing high hydrogenation activity.

What is claimed is:
1. A method for synthesizing a mesoporous zeolite ETS-10 containing a metal without a templating agent, comprising the steps of:
   (1) mixing a silicon source with a NaOH solution to obtain a mixed solution so that the content of $Na_2O$ in the mixed solution is 10.0% to 20.0% by weight;
   (2) adding a KOH or KF solution into the mixed solution of step (1) so that the content of $K_2O$ is 10.0% to 25.0% by weight and stirring it well;
   (3) adding a titanium source solution into the mixed solution of step (2) and stirring it well;

(4) adding into the mixed solution of step (3) a precursor compound containing metal Ni and/or Co and stirring it well; and (5) subjecting the mixed solution of step (4) to a crystallization reaction to obtain the mesoporous zeolite ETS-10.

2. The method according to claim 1, wherein, the titanium source is titanium trichloride.

3. The method according to claim 1, wherein the precursor compound containing metal Ni is nickel nitrate hexahydrate, and the precursor compound containing metal Co is cobalt nitrate hexahydrate.

4. The method according to claim 1, wherein the total amount of metal Ni and Co comprises 1.5% to 3.0% by weight of the mass of zeolite, and the ratio of the atomic amount of metal Ni to Co is 0-1:1 or 1:1-0.

5. The method according to claim 1, wherein the crystallization reaction is carried out under a condition in which the reaction temperature is 200° C. to 250° C. and the reaction time is 20 to 110 hours.

6. The method according to claim 1, wherein each raw material in the system for synthesis is fed in a molar ratio, in terms of $SiO_2:TiO_2:Na_2O:K_2O:H_2O:NiO$, of (5~8):1:(3~7):(0.5~2):(100~220):(0.02~0.05), wherein the molar number of sodium oxide is the sum total of sodium elements contained in the water glass as a silicon source and sodium hydroxide.

7. The method according to claim 1, wherein the mesoporous zeolite ETS-10 has a specific surface area of 320 to 420 $m^2/g$, and a mesopore volume of 0.11 to 0.21 $cm^3/g$.

8. The method according to claim 1, wherein the crystallization reaction is carried out under a condition in which the reaction temperature is 200° C. to 230° C. and the reaction time is 72 to 110 hours.

9. The method according to claim 1, wherein each raw material in the system for synthesis is fed in a molar ratio, in terms of $SiO2:TiO2:Na2O:K2O:H2O:NiO$, of (6~7):1:(3~5):(1~1.7):(150~200):(0.03~0.04), wherein the molar number of sodium oxide is the sum total of sodium elements contained in the water glass as a silicon source and sodium hydroxide.

10. The method according to claim 1, wherein the said silicon source is a water glass with a composition of $SiO_2$ included in an amount of 5.2 to 6.0 mol/L, $Na_2O$ included in an amount of 1.3 to 2.0 mol/L, and $H_2O$ included in an amount of 45.0 to 50.0 mol/L.

11. The method according to claim 10, wherein, the titanium source is titanium trichloride.

12. The method according to claim 11, wherein the precursor compound containing metal Ni is nickel nitrate hexahydrate, and the precursor compound containing metal Co is cobalt nitrate hexahydrate.

13. The method according to claim 11, wherein the crystallization reaction is carried out under a condition in which the reaction temperature is 200° C. to 250° C. and the reaction time is 20 to 110 hours.

14. The method according to claim 11, wherein the total amount of metal Ni and Co comprises 1.5% to 3.0% by weight of the mass of zeolite, and the ratio of the atomic amount of metal Ni to Co is 0-1:1 or 1:1-0.

15. The method according to claim 14, wherein the crystallization reaction is carried out under a condition in which the reaction temperature is 200° C. to 250° C. and the reaction time is 20 to 110 hours.

16. The method according to claim 15, wherein each raw material in the system for synthesis is fed in a molar ratio, in terms of $SiO_2:TiO_2:Na_2O:K_2O:H_2O:NiO$, of (5~8):1:(3~7):(0.5~2):(100~220):(0.02~0.05), wherein the molar number of sodium oxide is the sum total of sodium elements contained in the water glass as a silicon source and sodium hydroxide.

17. The method according to claim 16, wherein the mesoporous zeolite ETS-10 a specific surface area of 320 to 420 $m^2/g$, and a mesopore volume of 0.11 to 0.21 $cm^3/g$.

* * * * *